United States Patent
Girault et al.

(10) Patent No.: US 6,499,521 B2
(45) Date of Patent: Dec. 31, 2002

(54) LOW ASPECT RATIO PNEUMATIC TIRE WITHOUT SIDEWALLS

(75) Inventors: Jean-Marie Girault, Lasne (BE); Percy Anthony Le Maire, Arlon (BE); Roland Andre Terver, Roost (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 25 days.

(21) Appl. No.: 09/844,094

(22) Filed: Apr. 27, 2001

(65) Prior Publication Data

US 2001/0050126 A1 Dec. 13, 2001

Related U.S. Application Data

(60) Provisional application No. 60/209,859, filed on Jun. 7, 2000.

(51) Int. Cl.[7] .............................. B60C 3/04; B60C 9/18; B60C 17/00
(52) U.S. Cl. ........................ 152/454; 152/516; 152/517; 152/532
(58) Field of Search .............................. 152/454, 532, 152/516, 517

(56) References Cited

U.S. PATENT DOCUMENTS

| | | |
|---|---|---|
| 1,293,528 A | 2/1919 | Palmer |
| 1,428,726 A | 9/1922 | Warth |
| 1,456,062 A | 5/1923 | Killen |
| 2,713,373 A | 7/1955 | Daugherty |
| 4,467,852 A | 8/1984 | Ippen et al. |
| 4,776,378 A | * 10/1988 | Griffiths et al. ............. 152/454 |
| 4,811,771 A | 3/1989 | Shoemaker et al. |
| 4,967,817 A | 11/1990 | Boehmer et al. |
| 5,693,160 A | 12/1997 | Kawabata et al. |

FOREIGN PATENT DOCUMENTS

| | | |
|---|---|---|
| DE | 2127588 | 12/1971 |
| DE | 25 34 840 | 2/1977 |

* cited by examiner

*Primary Examiner*—Adrienne C. Johnstone
(74) *Attorney, Agent, or Firm*—Howard M. Cohn

(57) ABSTRACT

A pneumatic radial ply tire with an aspect ratio of less than 50 has a ground contacting tread radially outward of a circumferential belt structure which in turn is radially ourtward of a carcass structure. The carcass structure has a pair of bead areas that include a bead foot compatible with a conventionally-shaped wheel rim having flanges with laterally extending portions. The carcass structure has a cord-reinforced elastomeric ply layer extend laterally between the two bead areas and radially inward of the belt structure. The tread area is directly connected to the bead areas without a sidewall. Rim flange protectors comprising a continuous circumferential elastomeric projection extend laterally outward from each bead/tread area and thereby radially outward of the rim flanges.

4 Claims, 2 Drawing Sheets

LOW ASPECT RATIO PNEUMATIC TIRE WITHOUT SIDEWALLS

CROSS-REFERENCE TO RELATED APPLICATIONS

This application claims the benefit of U.S. Provisional Patent Application No. 60/209,859, filed Jun. 7, 2000 by Girault et al.

TECHNICAL FIELD

The present invention generally relates to pneumatic tires, specifically radial tires with a very low aspect ratio.

BACKGROUND OF THE INVENTION

The sidewalls of conventional pneumatic tires provide these conventional tires with desirable flexibility in the radial direction. This radial flexibility allows the tread surface to move radially inward to accommodate irregularities in the road surface. However, the sidewalls of conventional tires also limit the performance of the tire with undesirable lateral and circumferential flexibility. Lateral sidewall flexibility limits the responsiveness of the tire in cornering, and circumferential flexibility limits the tire's capacity to handle the torsional forces encountered in acceleration and deceleration. In addition, the space required for the sidewall limits the maximum size of the wheel and the size of the brake mechanism that can be fit within the wheel for a given overall tire diameter.

When normally inflated, the sidewalls of conventional tires protect the rim from possible contact with the road surface. Also, conventional sidewalls distribute the weight of the vehicle and the force of impacts with road hazards by acting in tension to confine the compressive force provided by the air in a normally inflated tire. However, when normal inflation air pressure is lost, such as when the tire is punctured, the relatively thin and flexible sidewalls of a conventional tire collapse and buckle in such a manner that the sidewall fails to provide its normal functions of radial flexibility, rim flange protection, or the distribution of forces from the wheel to the road.

Conventional radial ply tires with low aspect ratios have been developed in part to address the limitations of sidewalls. As noted by U.S. Pat. No. 4,811,771, ('771), there are basically two different shapes of passenger tires on the road today: high aspect ratio tires (aspect ratio>69) and low aspect ratio (aspect ratio<70) tires. The low aspect ratio tires, where the radial depth of the sidewall is reduced relative to the tread width, have better cornering characteristics and less rolling resistance than the high aspect ratio tires. Patent '771 discloses the use of a special low aspect ratio tire (aspect ratio of 40 to 45) used in conjunction with a new larger diameter wheel (18 to 20 inches).

Recognition of the advantages of reducing the radial depth of the sidewall is not new. U.S. Pat. No. 1,293,528, discloses the use of a plurality of chain rings as an "inexpansible" bond to provide a pneumatic tire having a cross section under inflation to present a most advantageous width for weight carrying capacity and which will have only the minimum radial depth necessary to provide the requisite cushioning action, so that the wheel rim may be as close as practicable to the surface traveled over and the driving power thereby most efficiently transmitted.

U.S. Pat. No. 1,456,062 discloses a tire that has no straight sidewalls or belly part, independent of its wide gable-like tread, as in existing types of inflated tires. In fact the whole of the tire cover, with the exception of its suitable inextensible base beads is a shock absorbing tread, which "may be used to replace existing types of solid rubber band tires". The tread is arced, with a narrow blunt apex on its centerline, so that the footprint varies in size with the applied load. As best it can be determined from the description in this 1923 patent, the tire does not have belts or beads in the same sense as modern-day tires. The patent mentions "inextensible base beads" but describes and illustrates these beads as being part of "an abnormally strong and preferably thin supple foundation . . . which may be manufactured from woven cord and be endless and abnormally strong in every direction." As described, the tires appear to have aspect ratios somewhere around 48%. This unbelted, non-radial ply tire also provides rim flange protection and limited runflat capability as seen in the Patent's FIG. 3, where the flattened, deflated tire is thick enough to support the vehicle by pressing against the substantially flat well of the wheel without loading the wheel rim flanges.

Other patents describe tires, such as racing tires, with aspect ratios as low as 25% but still having sidewalls. For example, German Pat. No. 25 34 840 discloses a low aspect ratio tire with a running tread having a width which is at least half the total width of the tire, and preferably less than two-thirds of the total width of the tire. The remainder of the tire width comprises sidewalls which are radially diverted towards the seating surfaces of the tire rim.

German Pat. No. 2 127 588 discloses a very low profile pneumatic tire for racing cars (aspect ratio less than 25%) having a broad tread moulded in a concave shape so that it becomes flat when the tire is inflated at low pressure. The maximum width of the rim is 120% of the wheel diameter. The tire may be of radial or crossply construction. The sidewalls are substantially flat and vertical in an un-inflated tire.

While it may not be apparent, there exists a potential to develop a pneumatic radial tire with revolutionary dimension properties providing superior performance when compared to conventional pneumatic radial tires. The challenge is to develop such a tire combining improved handling and performance with adequate radial flexibility, sufficient rim flange protection and enhanced runflat capability suitable for use on conventionally-shaped (i.e., standard) wheel rim designs.

SUMMARY OF THE INVENTION

The tire of the present invention embodies radical dimensional properties applied to a pneumatic radial tire having a tread area comprising a ground contacting tread and a circumferential belt structure that is directly joined to the bead areas of the tire without sidewalls, providing the tire with an aspect ratio of less than 50 and preferably less than 25. Each bead area comprises a bead foot compatible with a standard wheel rim shape and at least one inextensible annular bead. The tire has a carcass structure comprising at least one cord reinforced elastomeric ply layer, the cords of each ply layer having a more or less radial orientation, the ply layers extending laterally between the two bead areas and radially inward of the belt structure. The bead areas also have rim flange protectors comprising continuous circumferential elastomeric projections extending laterally outward from the bead area and adjacent to and radially outward of the wheel rim flanges. Because the relatively thin and flexible sidewall structure is eliminated in the tire of the present invention, the tire maintains structural integrity while uninflated. The addition of elastomeric reinforcing material of sufficient thickness and strength to the area where the bead areas are joined to the tread area will allow the tire to support the weight of a vehicle and provide extended runflat operation.

The tire of the present invention may use one or more carcass plies that may be turned up around the beads in each bead area. Also the bead areas may comprises elastomeric apexes, chafers, chippers and/or flippers. The tread and belt structure can be extend radially and laterally outward from the bead with an elastomeric shoulder wedge located radially outward and adjacent to each bead area and radially inward of the belt structure.

A preferred embodiment of the tire of the present invention operationally fits on a conventionally-shaped wheel rim which is from 2 to 5 inches (51 to 127 mm) wider than a standard automotive tire rim, and which also has a nominal rim diameter of from 4 to 6 inches (102 to 152 mm) more than the standard wheel rim. For example, the tire could be a P210/20R19 tire on a 7.5J19H2 rim.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract. In some cases, similar elements may be referred to with similar numbers in a single drawing. For example, a plurality of elements 199 may be referred to as 199*a*, 199*b*, 199*c*, etc.

Figure 1:
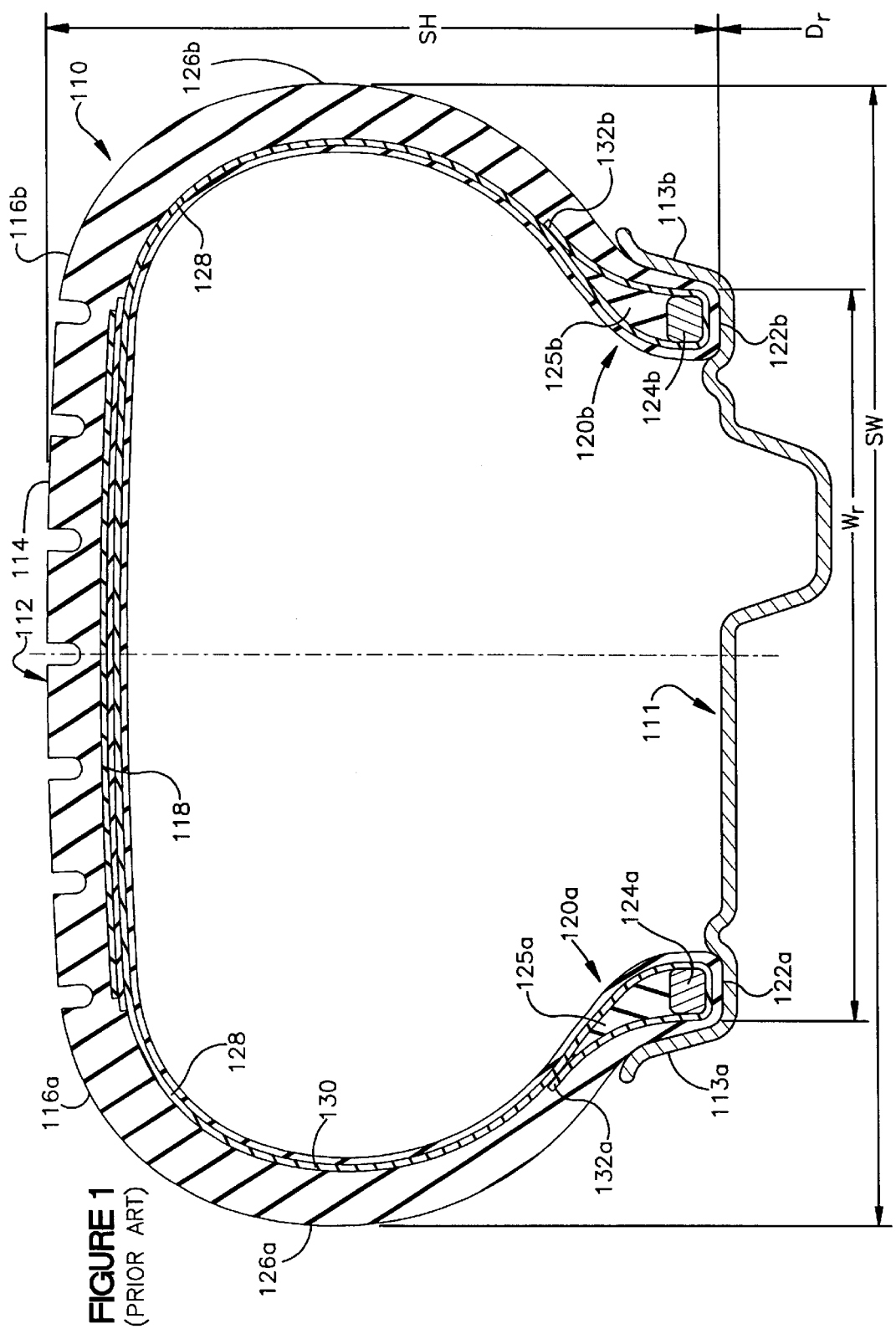
Figure 2:
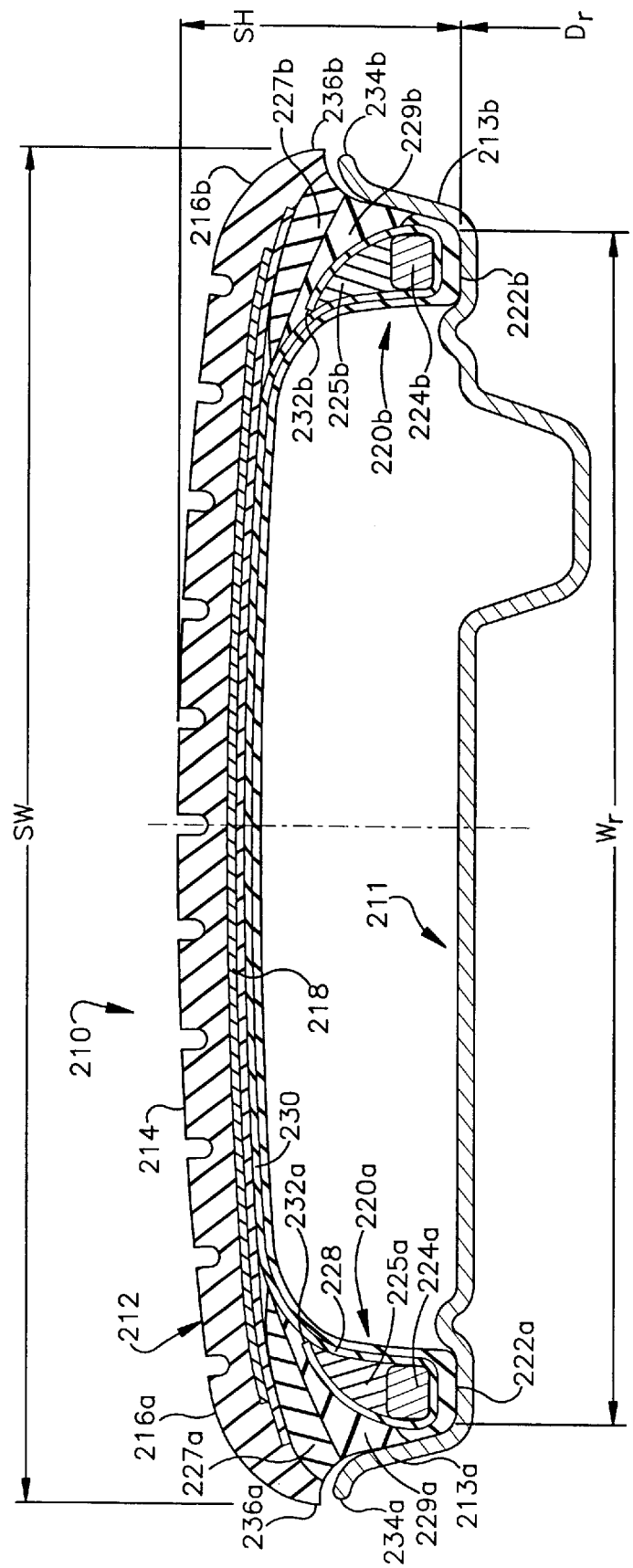

The structure, operation, and advantages of the present preferred embodiment of the invention will become further apparent upon consideration of the following description taken in conjunction with the accompanying drawings, wherein:

FIG. 1 is a partial section of a conventional low aspect ratio tire on a wheel rim; and FIG. 2 is a partial section of a tire of the present invention on a wheel rim.

DEFINITIONS

"Aspect Ratio" means the ratio of the section height of the tire to the section width of the tire, the ratio herein expressed as a percentage.

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Apex" means elastomeric filler normally used in an area within the tire where air could be trapped in its absence, such as radially outward of the beads.

"Bead" means that part of the tire comprising an annular tensile member of radially inner wires that are associated with holding the tire to the rim.

"Bead Area" means the region of the tire surrounding and including the bead.

"Bead Foot" means the portion of the bead area which contacts the wheel rim's bead seat and flange.

"Belt Structure" or "Reinforcement Belts" or "Belt Package" means at least two annular layers or plies of parallel cords, woven or unwoven, underlying the tread, unanchored to the beads, and having both left and right cord angles in the range from 18 degrees to 30 degrees relative to the equatorial plane of the tire.

"Carcass" means the tire structure apart from the belt structure, tread, and undertread, but including the bead areas and plies.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Crown area" means that portion of the tire carcass radially inward of the tread.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface under normal load pressure and speed conditions.

"Lateral" means a direction going from one sidewall of the tire towards the other sidewall of the tire.

"Ply" means a cord-reinforced layer of rubber coated radially deployed or otherwise parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Rim Diameter (nominal)" means approximate diameter of the rim measured at the bottom of the flange (nominal or bead seat).

"Rim Width" means the distance between the inside rim flange surfaces.

"Section Height" means half the difference between the outer diameter of the tire and the nominal rim diameter.

"Section Width" means the maximum width of a properly mounted and inflated tire, measured between outside surfaces of the two sidewalls, excluding decorations and sidewall-protecting ribs or bars.

"Shoulder" means the upper portion of sidewall just below the tread edge.

"Sidewall" means that portion of a tire between the tread and the bead areaarea.

"Tread" means the ground contacting portion of a tire.

"Tread Area" means the annular portion of a tire including the crown area of the carcass, the tread, and everything between the two (e.g., belt structure, undertread).

"Undertread" means the tread material between the bottom of the tread grooves and the carcass.

DETAILED DESCRIPTION OF THE PREFERRED EMBODIMENT

Referring now to the drawings, which are for purposes of illustrating a preferred embodiment of the invention only, and not for purposes of limiting the invention.

Prior Art Embodiment

FIG. 1 shows a partial section of a prior art low aspect ratio tire 110 on a standard wheel rim 111. For example, the tire 110 is a P205/60R13 and the rim 111 is a conventionally-shaped 5.5J13H2 rim wherein the "J" denotes the shape of the flanges 113a, 113b, and the "H2" denotes the shape of the remainder of the rim 111. The prior art tire 110 has a tread area 112 comprising a ground contacting tread 114 having two tread edges (shoulders) 116a, 116b and a circumferential belt structure 118 located radially inward of the tread. The prior art tire 110 has two bead areas 120a, 120b, each bead area having a bead foot 122a, 122b, an inextensible metal wire bead 124a, 124b, and an apex 125a, 125b. Elastomeric sidewalls 126a, 126b extend radially outward from the bead areas 120a, 120b respectively, to the tread edges 116a, 116b respectively. As shown in FIG. 1, the conventional tire 110 has a carcass structure 128 comprising at least one cord reinforced elastomeric ply layer 130 extending radially outward from the bead area 120a, through the sidewall 126a, radially inward of the belt structure 118, radially inward through the sidewall 126b to bead area 120b. Within each bead area 120a, 120b, the ply layer 130 extends radially inward of the beads 124a, 124b, having turned up ends 132a, 132b located adjacent to the main portion of the ply layer 130 in the bead areas 120a, 120b radially outward of the beads 124a, 124b. The prior art tire 110 as shown has an aspect ratio of approximately 60. Typical low aspect ratio tires have an aspect ratio ranging from 60 to 70, and racing tires are known with aspect ratios down to about 45. For the illustrated tire 110 and rim 111, the dimensions are approximately as follows: rim width (Wr) is 5.5 inches (140 mm); rim diameter (Dr) is 13 inches (330 mm); section width (SW) is 8.4 inches (213 mm); section height (SH) is 4.95 inches (126 mm). The aspect ratio calculates to 100(4.95/8.4)=59 or approximately 60%.

Embodiment of the Present Invention

Referring now to FIG. 2, a preferred embodiment of the present invention is illustrated as a partial section of a tire 210 mounted on a conventionally-shaped wheel rim 211. Although the rim 211 has the same general shape as the standard rim 111, the rim 211 for the tire 210 of this invention is approximately 2 to 5 inches (51–127 mm) wider, and 4 to 6 inches (102–152 mm) larger in diameter than standard wheel rims such as rim 111. The tire 210 has a tread area 212 comprising a ground contacting tread 214 having two tread edges 216a, 216b and a circumferential belt structure 218 located radially inward of the tread. The tire 210 has two bead areas 220a, 220b, each bead area having a bead foot 222a, 222b, an inextensible metal wire bead 224a, 224b, and an apex 225a, 225b. Optional elements of the bead area are not shown, but may include such common elements as chafers, chippers, and flippers. As shown in FIG. 2, the tread area 212 is joined directly to the bead areas 220a, 220b without any sidewalls. Shoulder wedges 227a, 227b of elastomeric material may be inserted between the bead areas 220a, 220b and the belt structure 218 in the vicinity of the tread edges 216a, 216b to provide the desired tread profile and to thicken and strengthen the junction of the tread area 212 with the bead areas 220a, 220b. The tire 210 has a conventional radial ply carcass structure 228 comprising at least one cord reinforced elastomeric ply layer 230 extending radially outward from the bead area 220a, radially inward of the belt structure 218, and radially outward from the bead area 220b. Within each bead area 220a, 220b, the ply layer 230 extends radially inward of the beads 224a, 224b, having turned up ends 232a, 232b located adjacent to the main portion of the ply layer 230 in the bead areas 220a, 220b radially outward of the beads 224a, 224b. The bead feet 222a, 222b are designed for compatibility with the conventionally-shaped wheel rims 211 having a laterally extending portion 234a, 234b on each rim flange 213a, 213b. In addition, each bead area 220a, 220b is provided with a rim flange protector 236a, 236b comprising a continuous circumferential elastomeric projection extending laterally outward from each bead/tread area 220a/212, 220b/212 thereby extending radially outward of the rim flanges 213a, 213b, and laterally outward to at least the outermost edge of the laterally extending portions 234a, 234b of the rim flanges 213a, 213b of the conventionally-shaped wheel rim 211.

Preferably the tire 210 is provided with limited runflat capability by disposing an insert 229a, 229b of an elastomeric material such as in the rim flange protectors 236a, 236b where the tread area 212 and bead areas 220a, 220b are joined. Such elastomeric materials are well known to those skilled in the art of runflat tire design.

The elastomeric material of which the inserts 229a, 229b are made preferably has low hysteresis with a hot rebound in the range of about 70 to about 90 and preferably about 80 to about 90, to inhibit the buildup of heat during both normal inflated operation and, especially, during runflat operation when flexure of the inserts is greatest. If the hot rebound were lower than 55, the material would have a tendency to burn during runflat operation. The elastomeric material has a Shore A hardness of about 70 to about 80, a Modulus of about 5 to about 9 Mpa and a Hot Rebound (100°0 C.) of about 70 to about 90. However, it is recognized by the inventor that the elastomeric material of which the inserts 229a, 229b are made might have its properties further adjusted and controlled by means of the incorporation of randomly or otherwise aligned fibers, such as aramid, nylon, rayon, polyester, of various lengths, or by the addition of filler materials, such as polyethylene, cellulose, chosen to adjust the properties of stiffness.

The tire 210 of the present invention has an aspect ratio much less than 50 and preferably less than 25. For example, the tire 210 illustrated in FIG. 2 is a P210/20R19 and the rim 211 is a conventionally-shaped 7.5J19H2 rim wherein the "J" denotes the shape of the flanges 213a, 213b, and the "H2" denotes the shape of the remainder of the rim 211. For the illustrated tire 210 and rim 211, the dimensions are approximately as follows: rim width (Wr) is 7.5 inches (191 mm); rim diameter (Dr) is 19 inches (483 mm); section width (SW) is 8.27 inches (210 mm); section height (SH) is 1.77 inches (45 mm). The aspect ratio calculates to 100(45/210)=21 or approximately 20%.

Dynamic Operation of the Inventive Concept

A conventional tire 110 is typically provided with relatively thin and flexible sidewalls 126a, 126b. A tire 210 embodying the present invention joins the tread area 212 directly to the bead areas 220a, 220b, thereby eliminating the flexible sidewall structure. The elimination of the sidewall improves the structural integrity of the tire 210 and increases the radial, lateral and circumferential stiffness of the tire. Increased lateral stiffness improves cornering performance. Increased circumferential stiffness improves handling during acceleration and deceleration particularly in combination with cornering. Forces associated with irregularities in the road surface will be transmitted more directly from the tire 210, with reduced radial flexibility, to the suspension of the vehicle which is typically well designed to accommodate such forces.

Since tread area 212 is joined directly to the bead area 220a, 220b without sidewalls, the structural integrity of the tire is maintained when air pressure is lost allowing the continued operation of the tire during runflat operation. With a conventional tire 110, the sidewalls 126a, 126b tend to buckle as the tire becomes flat. Conventional runflat tires are provided with reinforcing elastomeric inserts (not shown) to provide the sidewalls 126a, 126b with additional thickness strength and stiffness to support the weight of a vehicle in the event that tire air pressure is lost. These sidewall reinforcing inserts increase the complexity, weight and cost of conventional runflat tires. Since the present invention eliminates the sidewall, a tire 210 of the present invention can provide runflat operation without additional sidewall reinforcing inserts. Thus a tire 210 of the present invention can provide runflat capability without the complexity or weight of sidewall reinforcing inserts.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial ply tire having a tread area comprising a ground contacting tread radially outward of a circumferential belt structure;

each bead area comprising a bead foot compatible with a wheel rim having flanges with laterally extending portions, an inextensible annular bead, and an apex; and a carcass structure comprising at least one cord-reinforced elastomeric ply layer, the at least one ply layer being reinforced by cords having a substantially radial orientation, the ply layers extending laterally between the two bead areas and radially inward of the belt structure; the tire characterized by:

the tread area being directly connected to the bead areas without a sidewall;

rim flange protectors comprising a continuous circumferential elastomeric projection extending laterally outward from the bead and tread areas, thereby extending radially outward of the rim flanges of the wheel rim when the tire is mounted on the rim; and an aspect ratio less than 25.

2. The tire of claim 1, characterized in that:

the tread area and belt structure extend radially and laterally outward from each bead area; and an elastomeric shoulder wedge is located radially outward and adjacent to each bead area and radially inward of the belt structure.

3. The tire of claim 1, characterized in that:

a pair of elastomeric reinforcing material inserts are provided where the tread area and bead areas are joined, and the inserts are of sufficient thickness and strength to support the weight of a vehicle and to allow operation of the tire while uninflated.

4. The tire of claim 1, characterized in that:

the at least one ply layer is turned up around the bead in each bead area.

* * * * *